May 21, 1968 O. K. MAWARDI 3,384,762

CRYOGENIC SWITCHING SYSTEMS FOR POWER TRANSMISSION LINES

Filed March 11, 1966 2 Sheets-Sheet 1

INVENTOR
OSMAN K. MAWARDI
BY Frederic B. Schramm
ATTORNEY

May 21, 1968 O. K. MAWARDI 3,384,762
CRYOGENIC SWITCHING SYSTEMS FOR POWER TRANSMISSION LINES
Filed March 11, 1966 2 Sheets-Sheet 2

INVENTOR
OSMAN K. MAWARDI
BY Frederic B. Schramm
ATTORNEY 3,384,762

CRYOGENIC SWITCHING SYSTEMS FOR POWER TRANSMISSION LINES

Osman K. Mawardi, Cleveland Heights, Ohio, assignor to Case Institute of Technology, a corporation of Ohio Filed Mar. 11, 1966, Ser. No. 533,660
12 Claims. (Cl. 307—245)

ABSTRACT OF THE DISCLOSURE

A tube composed of superconductive material is connected at one end to a concentric rod of ordinary conductor material and the remaining ends are connected to the conductors of a transmission line in a high-current pulse circuit to form a current cut off switch for the circuit. Quenching the superconductive material to normal state terminates the heavy current flow. In one embodiment self-magnetic field quenches the switch electromagnetically. In another heating is employed for quenching.

This application relates to pulsed inductive energy systems and concerns means for storing large amounts of electrical energy and abruptly releasing the energy.

More particularly, the application relates to the use of a cryogenic switch, in pulsed inductive energy systems, wherein large amounts of stored electrical energy can be released.

An object of the invention is interrupting a relatively large amount of current with short switching times. More specifically, an object of the invention is to enable currents of the order of hundreds of thousands of amperes to be switched in times as short as a microsecond.

A further object of the invention is storing electrical energy in amount of the order of millions of joules and delivering currents of the order of hundreds of thousands of amperes.

A more specific object of the invention is to provide improved means for storing electrical energy inductively.

Still another object of the invention is the rapid conversion of kinetic energy into electric energy.

Still another object of the invention is to employ the property of super-conductivity for abruptly switching very large electrical currents.

A further object of the invention is to provide an improved electrical switch of the coaxial type.

Still another object of the invention is to change the resistivity of a superconductive substance from zero to a few ohms abruptly.

Other objects, features and advantages of the invention will become apparent as the description proceeds.

In carrying out the invention in accordance with a preferred form thereof, a suitable high-current generator means is connected to cryogenic switch by a transmission line. The switch comprises superconductive material.

Preferably, the superconductive material is in the form of a hollow cylinder or tube concentric with a center rod, each connected at one end to one of the conductors of the coaxial transmission line. The tube and rod are connected at the other end, by a disk of higher resistance such as brass, bronze, or iron. The arrangement prevents the overheating of the outer conductor when it is in its normal state. In this fashion, the ohmic dissipation in the switch is lowered. The assembly is encased in suitable means for maintaining the temperature at which the property of super-conductivity is exhibited.

The arrangement is such that the self magnetic field produced by the flow of current through the rod serves for quenching the switch electromagnetically to the normal state.

In another arrangement external heating of the outer conductor by a resistance element or by absorption of electromagnetic radiation is used to quench the switch.

A superconductive material is chosen having a relatively high critical temperature for exhibiting the properties of superconductivity. For example, a cylinder or film composed of, or containing niobium may be employed. Preferably, a hard superconducting film is employed in which the niobium is present in the form of a niobium alloy, such as an alloy of niobium with zirconium or tin, such as, for example, $Nb_3Sn$.

For certain purposes, such as in obtaining a controlled thermo-nuclear fusion reaction, it is necessary to store and to discharge quickly very large amounts of energy. Large capacitor banks have been proposed for this purpose. However, as the energy requirements increase, capacitor banks become more expensive than inductive systems and become uneconomical. For example, where the amount of energy to be discharged exceeds about 100,000 joules (or watt-seconds) the banks of condensers become very large and expensive. Moreover, since the entire bank cannot be triggered by a single switch, switching problems are encountered.

From the standpoint of cost and size, therefore, inductive energy storage systems are preferred to capacitor storage systems. In accordance with the invention, inductive energy storage systems are rendered feasible by providing means for rapidly opening a current-carrying, inductive circuit. For this purpose a high-current capacity, superconducting switch is employed to open an inductive circuit. Very large storage capacity and rapid discharge are achieved in a low-inductance, high-current system with a superconducting switch employed to interrupt the current. An inductive energy storage system having several million joules storage capacity and capable of being discharged in microseconds is thus feasible. A superconductive or cryogenic switch in accordance with the invention will carry several hundred thousand amperes and can be abruptly changed in value from essentially zero resistance to a resistance of a few ohms.

Both pure metals, or "soft," superconductors and alloys or "hard" superconductors may be employed.

For pulsed inductive energy systems in which moderate amounts of electrical energy are to be pulsed, current supply systems, such as transformers may be employed with condenser banks for quenching. However, where relatively large amounts of energy are required, as in power supplies for plasma, lasers, and high magnetic field applications, I prefer to employ a homopolar generator as the current source. Preferably, a homopolar generator of the radial type is employed.

A better understanding of the invention will be afforded by the following detailed description considered in conjunction with the accompanying drawing, in which like reference characters are utilized throughout the drawing to designate like parts.

In the drawing, FIG. 1 is a view of a longitudinal section of a cryogenic switch constituting an embodiment of the invention in which the switch element constitutes a cylinder of a cryogenic metal.

Like reference characters are utilized throughout the drawings to designate like parts.

Figure 1:
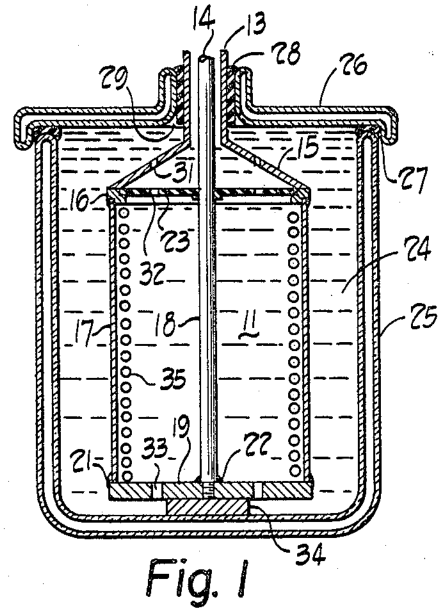

Referring to the drawing in the embodiment of the invention illustrated FIG. 1, there is a cryogenic switch 11 for a circuit connected thereto by means of a coaxial transmission line having an outer conductor 13 and an inner conductor 14. The outer transmission line conductor 13 is connected by flared portion 15 composed of electrolytic copper, and a brazed copper ring 16 to a hollow cylinder 17 composed of superconductive metal, preferably one having a high critical value such as niobium or a niobium-containing material e.g. a niobium alloy. The cryogenic switch 11 comprises, together with the superconductive cylinder 17, a center rod 18 of normal conductor material such as electrolytic copper, for example, electrically connected to or forming a continuation of the inner conductor 14 of the transmission line. The electrical circuit is completed at the lower ends of the conductors 17 and 18 by a low conductivity connection 19 which may take the form of silver or electrolytic copper disk brazed or soldered to the lower ends of the conductors 17 and 18 at 21 and 22, respectively.

For supporting the center rod 18 and holding it concentric with the outer cylinder 17, an insulating bushing and disk 23 is preferably provided.

Since the superconductive properties of the superconductive member of the cryogenic switch depend upon maintenance of the temperature at a level close to absolute zero, the entire coaxial switch 11 is immersed in a suitable liquified gas such as liquid helium 24 within a Dewar, double-walled flask 25. In order that the coaxial switch 11 may be mounted in the flask 25, it is preferably formed with a removable cover 26 provided with a gasket 27 around the top of the flask 25 and loose packing 28 around the outer transmission line conductor 13 within the opening 29 in the cover 26. It will be understood that loose packing 28 comprises a suitable material such as cotton batten sufficiently dense to retard evaporation and loss of helium gas from the liquid body 24 but not sufficiently dense to permit excessive pressures to build up within the flask 25.

Vents 31, 32 and 33 are provided in the members 15, 23 and 19 respectively to permit free circulation of the liquid helium 24. Preferably, a spacing block 34 is placed under the metallic disk 19.

The supporting spacer or bushing 23 is composed of insulating material.

In order that quenching may be accomplished inductively, a quenching coil 35 is provided.

For every superconducting metal and alloy the region of zero resistance is a function of the temperature and the magnetic field present on the material. This is shown for various metals on FIG. 8. The region within the critical curve is the superconducting region and outside of the curve is the normal region, that is, the region in which the metal exhibits a normal resistivity. Niobium possesses the largest critical field value of the elements. Since the current carrying capacity of a superconducting device is related to the critical magnetic field, and since niobium also possesses the desirable properties of having a high normal resistance and a very high melting temperature, and niobium is readily obtainable, it has unique advantageous properties for use as a cryogenic switch.

In measuring the switching time of superconducting films it was found that very abrupt switching occurred if a current of about 1.25 times the critical current is passed through the element. Switching time is defined here as the time required for a specimen to attain half its normal resistance. Normal switching times are 50 nano-seconds. Switching time decreases with increased current but increases with specimen thickness. Thus thin film superconductors have several advantages over bulk superconductors when used as cryogenic switches. The advantages are increased current capacity and normal resistance and a decrease in switching times.

Under Silsbee's rule the maximum current carried by a superconductive conductor is equal to $$10^6/2B_0r$$

Where $B_0$=critical magnetic field in webers
$r$=radius in meters

If any greater current flows it will produce magnetic quenching of the superconductor. Thus Silsbee's rule states that the superconducting state of an element is determined only by the magnetic field present at the surface.

The critical magnetic field of hard or alloyed superconductors, such as an alloy of niobium and tin or an alloy of niobium and zirconium far exceeds that of any pure metal. However, hard superconductors do not behave in a manner predictable by Silsbee's hypothesis. This is believed to be due to the incomplete Meisner effect exhibited by these alloys. Hard superconducting materials will yield current capacities far greater than obtainable from pure niobium. Niobium $Nb_3Sn$ can be deposited on a magnesium silicate substrate to form either planar or tubular superconducting samples. With no externally applied field, specimens of vapor-deposited films, e.g., $Nb_3Sn$, quench at values of current corresponding to the critical field of the material.

By utilizing hard superconductor films one may construct switches having current capacities of 100,000 amperes and larger. Also, since the radius can be made quite small compared to the solid switches, and since it is possible to deposit reliable thin films, the normal resistance may be made quite high.

Instead of niobium or niobium tin, $Nb_3Sn$, I may use as the superconducting metal an alloy of niobium with a metal from Groups I, III and IV of the Periodic Table having an atomic number greater than 32. Examples of such alloys include $Nb_3Ge$, $Nb_3In$, $Nb_3Pb$, $Nb_3Au$. The invention does not exclude compounds of molybdenum and iridium, tantalum and tin, vanadium and silicon, vanadium and gallium and other compounds having high critical temperature for superconductivity.

Figure 2:
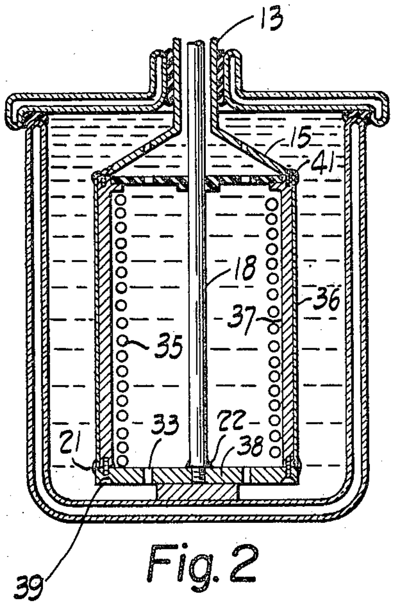
FIG. 2 is a view corresponding to FIG. 1, in which the cryogenic metal comprises a thin film on the surface of a supporting cylinder.

FIG. 2 illustrates a construction employing a superconducting film 36 deposited upon a substrate 37 to which the end connecting disk 38 is fastened by suitable means such screws 39. In this case the flare 15 of the outer conductor 13 is soldered to the upper end of the film 36 at 41.

Figure 3:
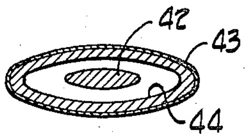
FIG. 3 is a cross sectional view of a modified type of cryogenic switch in which elliptical elements are employed instead of coaxial cylindrical.
Figure 4:
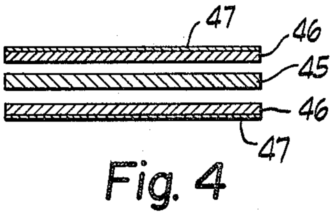
FIG. 4 is a diagram of a parallel plate configuration of the cryogenic switch in which the current in the center conductor is arranged to flow in the opposite direction to the current in the two outer conductors.

Although a construction has been described and illustrated in which the cryogenic switch is coaxial in form, the invention is not limited thereto and does not exclude the use of the configurations, such as elliptical cylindrical illustrated in FIG. 3 and parallel plate configuration illustrated in FIG. 4.

In the construction of FIG. 3, the center conductor or rod 18 of FIGS. 1 and 2, is replaced by a center conductor 42 of elliptical cross-section, so surrounded by a superconducting film 43 upon an elliptical cross-section substrate 44 that magnetic field intensity induced by the flow of current in the center conductor 42 is the same at all points around the periphery of the superconducting film 43.

In the construction of FIG. 4, a central conductor 45 in the form of a flat plate has mounted, on either side and spaced therefrom, plates 46 serving as substrates for superconducting films 47. It will be understood that electrical connections are made such that the electrical current flows in the opposite direction in the central conductor 45 to that in the outer conductors of super conducting material 47.

Suitable means may be employed to bypass the cryogenic switch and avoid evaporating the helium 24. For example, a copper bar may be connected across the transmission line 13 and 14, or a condenser may be connected across it.

In plasma work, an ignitron may be employed which operates on the voltage produced when the switch is closed. A thin film superconductor is advantageous for economy although it is not essential functionally to employ the thin film superconductor instead of the solid cylinder as in FIG. 1.

The Meissner effect is the phenomena observed when a material becomes superconductive in a magnetic field which extrudes all magnetic field from the conductor. In the embodiment illustrated in FIG. 5, this effect is employed by introducing sufficient current in the superconductor switch that the self magnetic field brings about a termination of the superconducting condition. A current pulse, as well as an inductive effect may be used to quench the current in the superconducting switch.

Figures 7, 8:
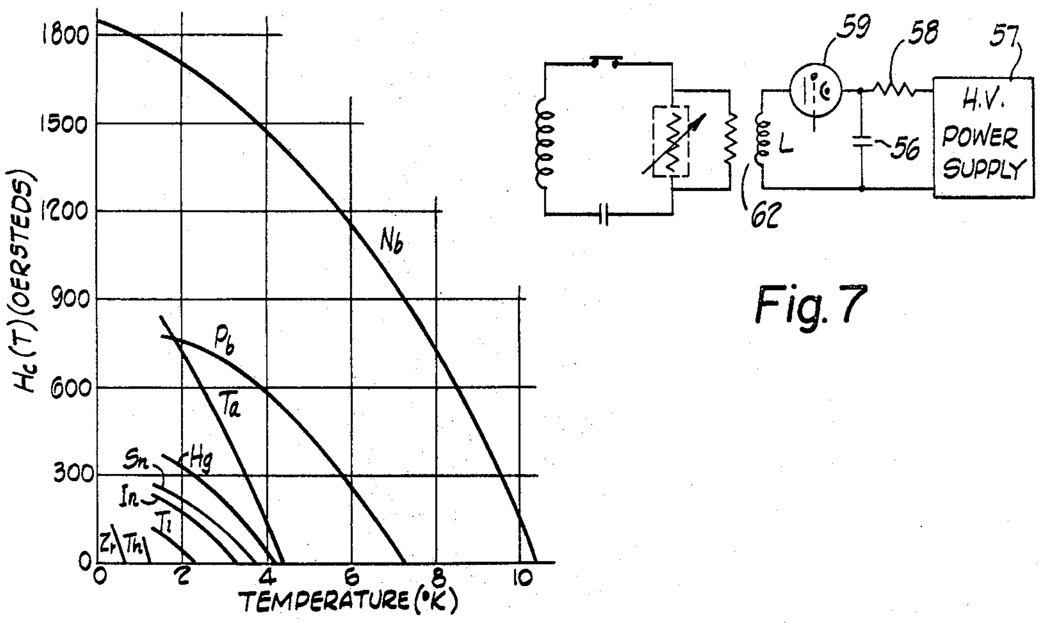
FIG. 7 is a circuit diagram of a modified arrangement in which quenching is accomplished by the heating produced by electromagnetically induced eddy currents.
FIG. 8 illustrates the phase diagram for various superconducting materials.

Instead of quenching by magnetic field or by current pulse, this may be accomplished from a light or direct heat source, since either heat or magnetic field will cause transition from the boundary of the critical curve illustrated in FIG. 8.

Figure 5:
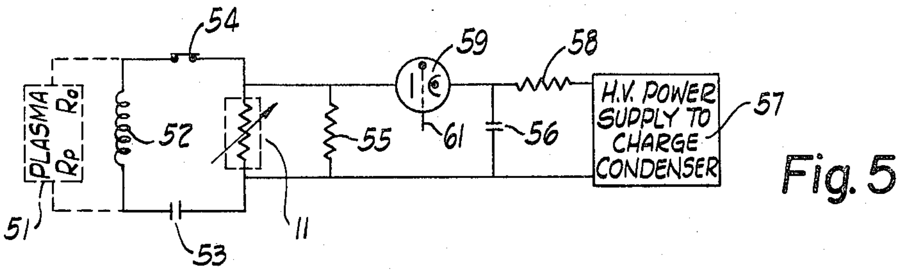
FIG. 5 is a circuit diagram illustrating application of a cryogenic switch in accordance with the invention in an inductive storage system.

In the system illustrated in FIG. 5, it is assumed that the system is employed for the control of the supply of a large current pulse to a plasma 51 having an initial resistance $R_p$ and a short circuit resistance $R_0$. For this purpose electrical energy is stored in a form of a very large current flowing through a relatively small inductance 52. The current flow through the inductance 52 is produced by a suitable source 53 capable of delivering a very large current of the order of hundreds of thousands of amperes connected to the inductance 52 through a closing switch 54 in series with a cryogenic switch 11, which may have the construction illustrated in FIG. 1 or alternatively another construction such as illustrated in FIG. 2, 3 or 4. Preferably, a protective shorting resistance 55 is connected across the cryogenic switch 11.

The shorting resistance 55 has a resistance less than that of the superconducting switch 11 in its normal state. Consequently, the shorting resistance 55 acts as a protection. When the switch becomes normal it would normally dissipate an appreciable amount of heat, causing the helium 24 to evaporate. However, the shorting resistance 55, is ineffective when the switch 11 is superconducting and does not interfere with the circuit. When the switch 11 becomes normal, then because of the low resistance of a short 55 it diverts a major portion of the current.

When it is desired to deliver a large pulse of electrical energy to the plasma 51 or other comparable load, the cryogenic switch 11 is quenched to raise its resistance abruptly from zero to several ohms. The abrupt interruption of current flow through the inductance 52 results in inducing a large electromotive force therein which in effect causes the current to be transferred to the plasma or other load connected across the inductance 52.

Figure 6:
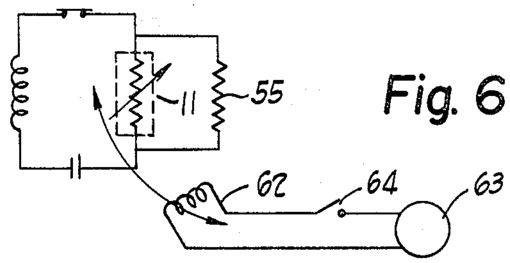
FIG. 6 is a circuit diagram in which quenching is accomplished by an external magnetic field, placed in close vicinity to the switch, instead of by a condenser discharge.

In the system illustrated in FIG. 5, quenching of the cryogenic switch 11 is accomplished by the discharge of electrical current through it. For supplying the quenching current a condenser 56 is provided with a high voltage power supply 57 for charging the condenser through a resistor 58. For release of the charge of the condenser 56 into the cryogenic switch 11, when quenching is desired, a suitable control device such as a thyratron 59 is provided. The thyratron 59 is conventional in form, having a control grid 61 connected to a suitable triggering circuit which may be synchronized with the source 53 for initiating the flow of current in the inductance 52 in such a manner as to provide the requisite time delay between the build up of current in the inductance 52 and the triggering of the control grid 61 to quench the superconducting switch 11. When the system of FIG. 5 is employed, quenching of the superconducting of cryogenic switch 11 results from a self magnetic field produced by the discharge of the condenser 56 in the switch 11. However, the invention is not limited to this method of operation and does not exclude quenching by an external magnetic field or by heating. For example, as illustrated in FIG. 6, a coil 62 may be placed in close proximity to the switch 11 so that magnetic flux produced by the coil 62 links with the switch. The coil 62 is connected to an alternator 63 through a control switch 64. The circuit is so designed that the field produced by the coil 62 is strong enough to exceed the quenching field of the cryogenic switch 11. Although an alternator 63 is illustrated, it will be understood that the invention is not limited thereto and the generator may also take the form of a condenser discharging into the coil 62.

When it is desired to accomplish quenching by heating effects, the coil 62 is supplied with alternating current of a suitable frequency to induce eddy currents in the cryogenic switch to heat it to a temperature high enough to cause it to quench.

As illustrated in FIG. 7, when it is desired to accomplish the quenching by producing a magnetic field in the cryogenic switch 11 from the coil 62, this may be accomplished by connecting the coil 62 in a series with the thyratron 59 across the condenser 56.

Figure 9:
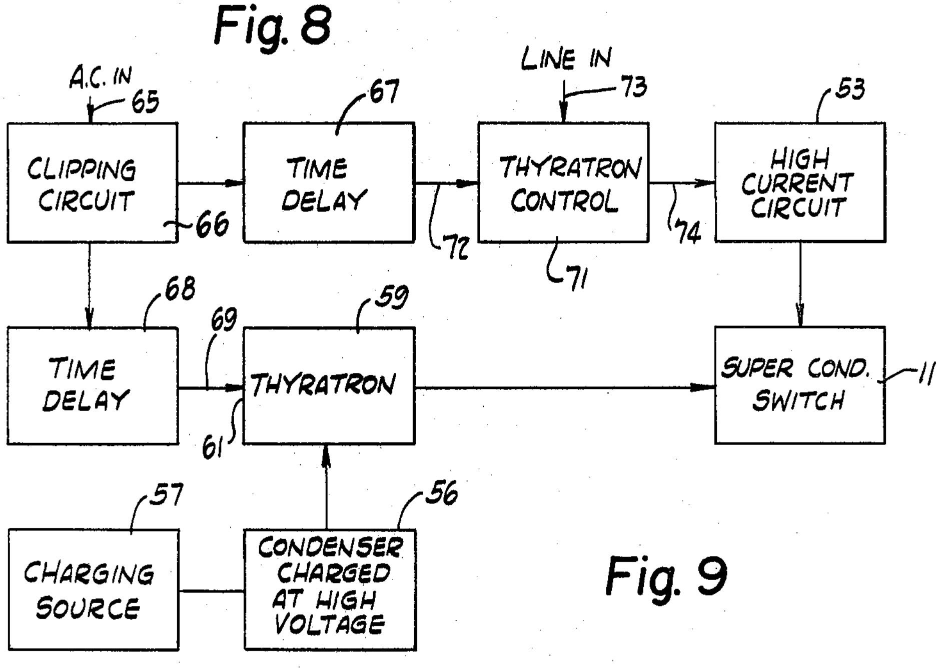
FIG. 9 is a block diagram of a control system.

An illustrative manner of controlling the superconductive switch 11 is shown in FIG. 9. For synchronizing purpose a source of alternating current 65 is supplied to a clipping circuit 66, which initiates the operation of two time delay circuits 67 and 68 when the alternating-current source 65 is energized. The time delay 68 has an output trigger line 69 to the control grid 61 of the thyratron 59. A second thyratron control 71 is provided which has a trigger line input 72 from the time delay 67 for controlling the energization of the high current source 53 from an input line 73 to a thyratron output line 74. The time delays 67 and 68 are so designed that the time delay 68 provides a longer time delay so as to fire the thyratron 59 and quench the superconductive switch 11 after the high current 53 has had time to build up its full current value.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore, to cover all such modifications and variations as fall within the scope of the invention.

What is claimed is:

1. Cryogenic electrical current switching means for an energy source generating current of the order of 100,000 amperes to be switched by such means comprising in combination:

a transmission line with first and second conductors adapted to be connected to an energy source generating current of the order of 100,000 amperes, an electrically conducting switch element having a first end connected to one of said transmission line conductors and having a second end, a switch element composed of a material having the property of superconductivity, variable in electrical resistance from a zero value at low temperature to a finite value comparable with that of ordinary conductors said variable resistance switch element having a first end connected to the other said transmission line conductor and having a second end, said switch element second ends being electrically connected together, and means for changing the electrical resistance of said variable switch element between zero and such finite value.

2. Electric current switching means as in claim 1, wherein means for changing the electrical resistance of the variable resistance switch element constitutes means for changing said element from super-conducting state to normal state and vice-versa.

3. Cryogenic electrical current switching means for a circuit utilizing a transmission line with first and second conductors, said switching means comprising in combination:

an electrically conducting switch element in the form of a rod having a first end for connection to one of such transmission line conductors and having a second end, a switch element in the form of a tube composed of a material having the property of superconductivity variable in electrical resistance from a zero value at low temperatures to a normal-state finite value, said tubular switch element surrounding said rod, having a first end for connection to the other of such transmission line conductors and having a second end, said switch element second ends being electrically connected together, and means for changing electrical resistance of said tubular resistance switch element between zero and such finite value.

4. Electric-current switching means as in claim 3, wherein the super-conducting tube is enclosed in a bath having a temperature below that at which the tube becomes super-conducting.

5. Electric-current switching means as in claim 4, wherein means are provided for passing a supplementary current pulse through the switching means to quench the current in the super-conducting tube.

6. An electric-current switching means as in claim 5, wherein the superconducting tube is in the form of a thin film.

7. An electric-current switching means as in claim 6, wherein the super-conducting tube film comprises niobium.

8. An electric-current switching means as in claim 7, wherein the super-conducting film is composed of an alloy of niobium.

9. An electric-current switching means as in claim 7, wherein the super-conducting film is composed of an alloy of niobium and a metal selected from Groups I, III, and IV of the Periodic Table of Elements having an atomic number greater than 32.

10. An electric-current switching means as in claim 9 wherein the super-conducting film is composed of an alloy of niobium and tin.

11. An electric-current switching means as in claim 10, wherein the super-conducting alloy consists of $Nb_3Sn$.

12. Electric-current switching means as in claim 11, wherein the liquid gas maintains the temperature below 18.05° C. absolute.

References Cited

UNITED STATES PATENTS

| | | | |
|---|---|---|---|
| 3,343,035 | 9/1967 | Garwin | 307—88.5 X |
| 2,936,435 | 5/1960 | Buck | 307—88.5 X |
| 3,012,154 | 12/1961 | Gold et al. | 307—88.5 |
| 3,027,524 | 3/1962 | May | 333—7 |
| 3,098,967 | 7/1963 | Keck | 307—88.5 X |

JOHN S. HEYMAN, *Primary Examiner.*